No. 855,969. PATENTED JUNE 4, 1907.
J. S. PAINE & E. E. WINKLEY.
MACHINE FOR LACING THE UPPERS OF SHOES.
APPLICATION FILED AUG. 29, 1902.

5 SHEETS—SHEET 1.

WITNESSES
Edwin F. Samuels.
Alfred H. Hildreth

INVENTORS
John S. Paine
Erastus E. Winkley
by their attorneys
Phillips Van Everen Fish No. 855,969. PATENTED JUNE 4, 1907.
J. S. PAINE & E. E. WINKLEY.
MACHINE FOR LACING THE UPPERS OF SHOES.
APPLICATION FILED AUG. 29, 1902.

5 SHEETS—SHEET 3.

WITNESSES
Edwin F. Samuels.
Alfred H. Hildreth.

INVENTORS
John S. Paine
Erastus E. Winkley
by their Attorneys
Phillips Van Everen Fish No. 855,969. PATENTED JUNE 4, 1907.
J. S. PAINE & E. E. WINKLEY.
MACHINE FOR LACING THE UPPERS OF SHOES.
APPLICATION FILED AUG. 29, 1902.

5 SHEETS—SHEET 4.

WITNESSES
Edwin F. Samuels.
Alfred H. Hildreth.

INVENTORS
John S. Paine
Erastus E. Winkley
by their Attorneys
Phillips Van Everen & Fish No. 855,969. PATENTED JUNE 4, 1907.
J. S. PAINE & E. E. WINKLEY.
MACHINE FOR LACING THE UPPERS OF SHOES.
APPLICATION FILED AUG. 29, 1902.
5 SHEETS—SHEET 5.
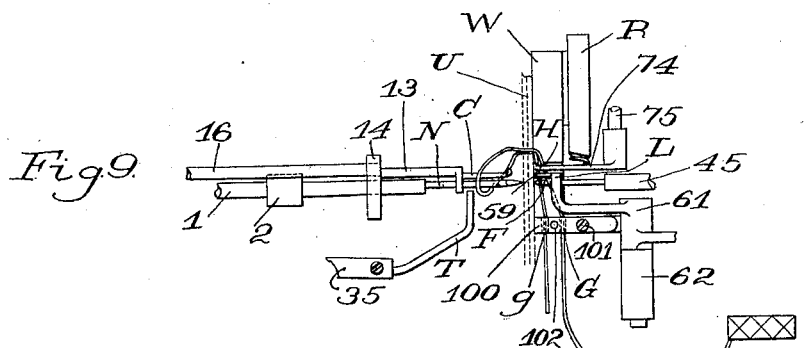
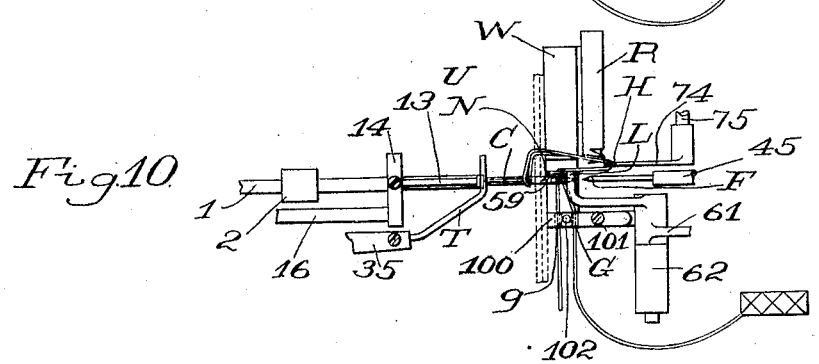
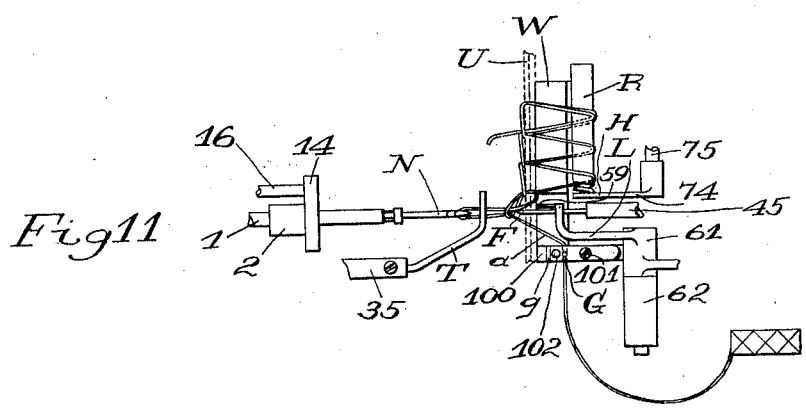
WITNESSES.
Edwin T. Samuels.
Alfred H. Hildreth.
INVENTORS.
John S. Paine
Erastus E. Winkley
by their Attorneys
Phillipp Van Mueren Fish

UNITED STATES PATENT OFFICE.

JOHN S. PAINE, OF BROCKTON, AND ERASTUS E. WINKLEY, OF LYNN, MASSACHUSETTS, ASSIGNORS OF ONE-THIRD TO BENJAMIN PHILLIPS, OF LYNN, MASSACHUSETS.

MACHINE FOR LACING THE UPPERS OF SHOES.

No. 855,969.        Specification of Letters Patent.        Patented June 4, 1907.

Application filed August 29, 1902. Serial No. 121,436.

*To all whom it may concern:*

Be it known that we, JOHN S. PAINE and ERASTUS E. WINKLEY, citizens of the United States, PAINE residing at Brockton, in the county of Plymouth, State of Massachusetts, WINKLEY residing at Lynn, in the county of Essex and State of Massachusetts, have invented certain new and useful Improvements in Machines for Lacing the Uppers of Shoes; and we do hereby declare the following to be a full, clear, and exact description of the invention, such as will enable others skilled in the art to which it appertains to make and use the same.

In the manufacture of a shoe the upper is laced with a string or thread preparatory to placing it on the last for lasting and other subsequent operations in order that the edges of the lacing slit shall be held at the proper distance apart to cause the upper to properly fit the last during the lasting operation. In actual practice prior to our invention, so far as we are advised, this lacing operation has been exclusively performed by hand, or by hand with the assistance of holding devices for holding the upper.

The present invention has for its object the provision of a machine for performing this lacing operation in a satisfactory manner.

Figure 1:
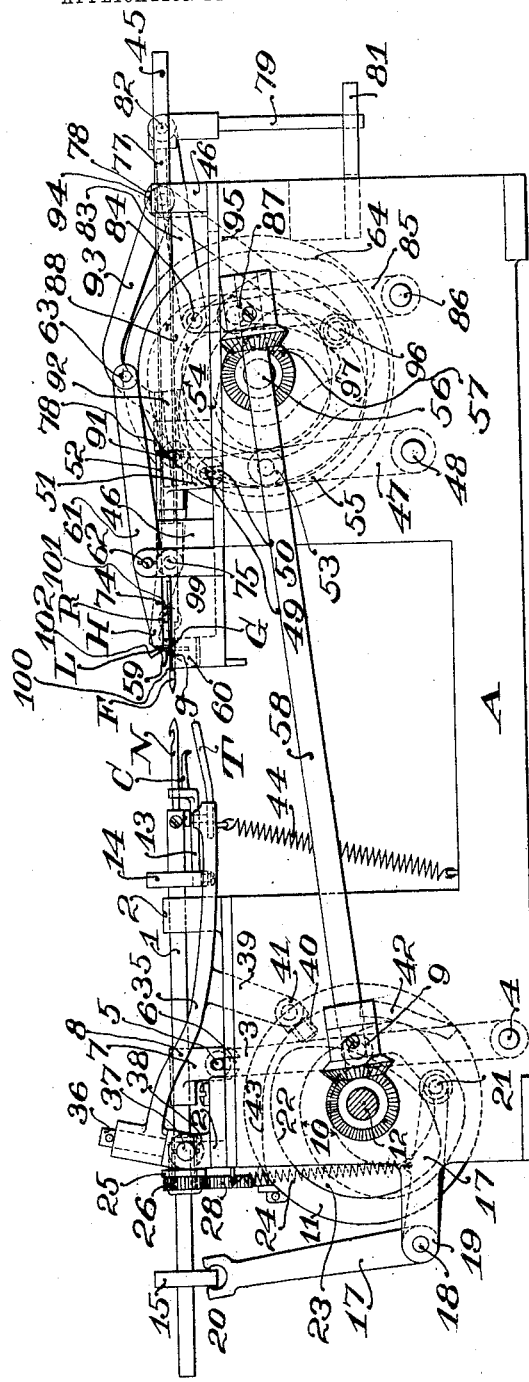
Figure 2:
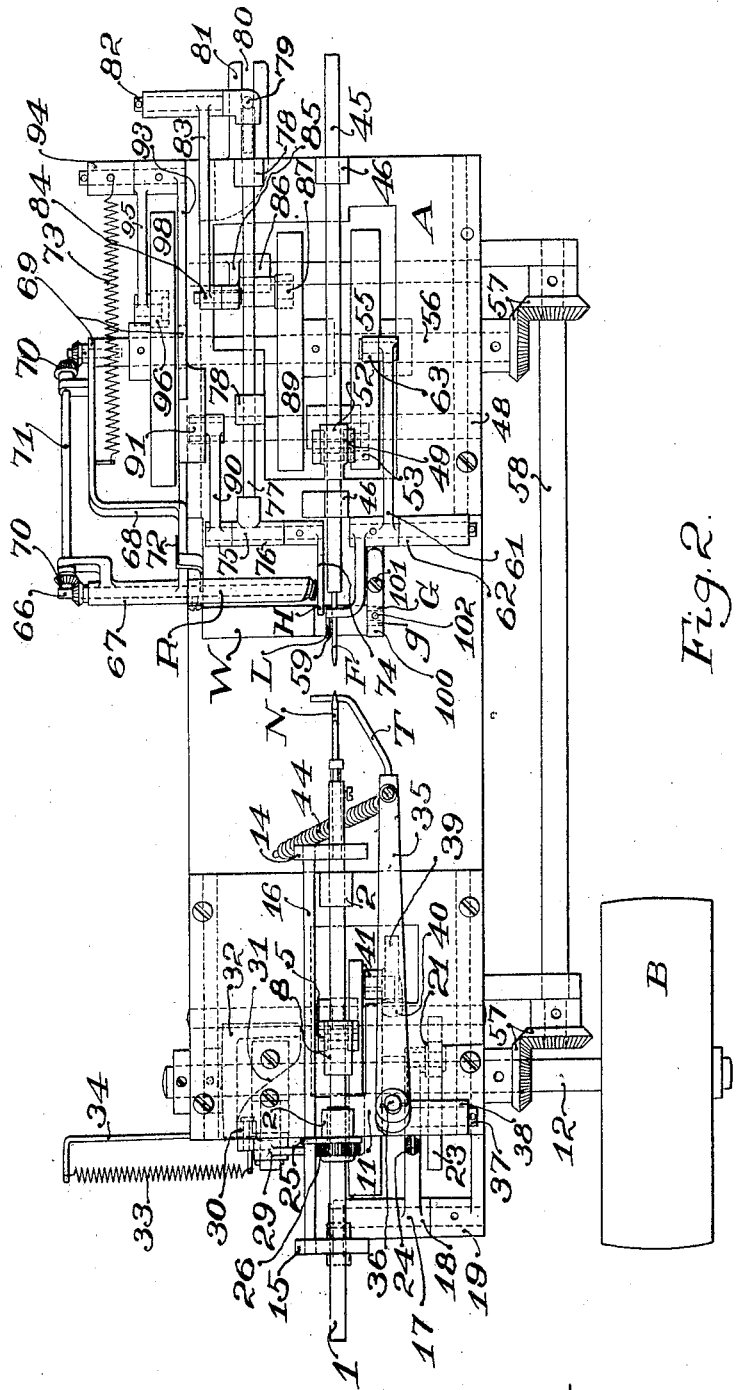
Figure 3:
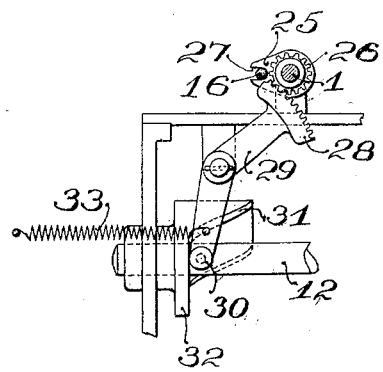
Figure 4:
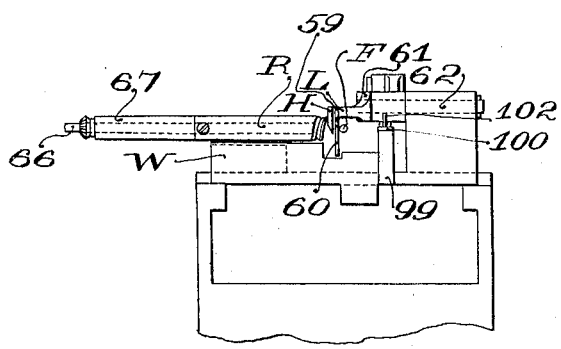
Figure 12:
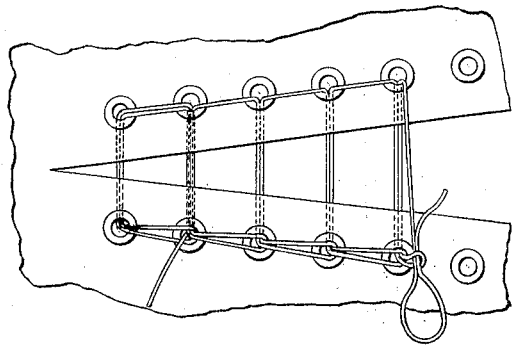
Figure 5:
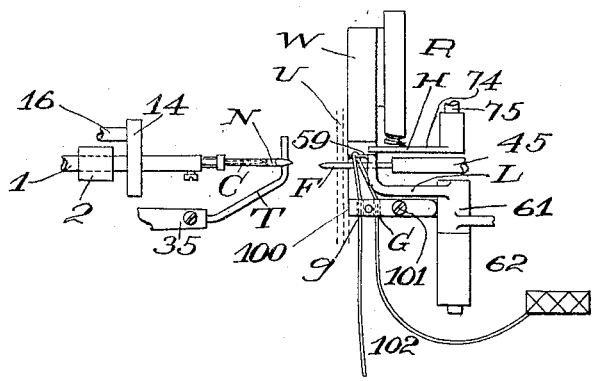
Figure 6:
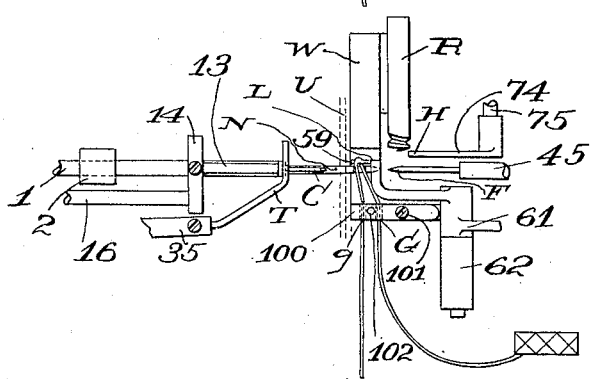

In the accompanying drawings illustrating a form of our invention, Figure 1 is a side elevation and Fig. 2 a plan of the complete machine; Figs. 3 and 4 illustrate details of construction hereinafter referred to; Figs. 5, 6, 7, 8, 9, 10 and 11 illustrate different positions which the parts assume at different stages of the operation of lacing a shoe, and Fig. 12 is a diagrammatic view of a portion of a shoe laced with our machine.

In the illustrated embodiment of our invention we have provided means for forming a series of chain stitches of thread through the eyelets of the upper of a shoe operating to tie a knot in the thread after the desired number of eyelets have been laced. We employ a finder for receiving the eyelet holes of the opposite sides of an upper to support the upper in proper position for a hook needle to enter and pass through the eyelet holes. A loop of thread is then laid in the hook of the needle by a looper and the needle retracting pulls a bight of thread through the eyelets. The work is then fed to a position with the next eyelets opposite the needle, and the needle, then again advancing, passes through the next eyelet holes, receives both strands of the thread forming the first loop, and again retracts, pulling two loops of thread through the former loop of thread thereby securing the first end of the thread; upon the formation of the next stitch the needle receives only one thread and pulls one loop of thread through the eyelet holes; these operations are repeated for the desired number of eyelets, when the material is moved to one side so that the needle, on advancing, passes beyond the edge of the upper, gets its loop of thread and draws such loop through the loop extending around the shank of the needle, thus tying a knot in the end of the thread. Means are employed for causing the successive stitches of thread to be made longer than sufficient to extend around the materials, that is to say, from eyelet hole to eyelet hole, so that when the upper is placed upon the last the edges will be held at the proper distance apart.

A machine having its parts constructed and arranged to operate as above indicated embodies our invention in the best form that we have devised. Certain features of our invention, however, are not limited to this type of machine but may be embodied in machines differing widely therefrom in construction and mode of operation. Thus our invention, except as defined in the claims, is not limited to forming any particular kind of stitches nor is it limited, except where such limitation is expressly stated, to any particular means for producing slack in the lacing, or for locating the eyelet holes in position to receive the lacing or for tying or securing either or both ends of the thread.

Having thus described in a general way the embodiment of our invention illustrated in the accompanying drawings, a detailed description of the complete machine will now be given followed by a description of the operation of the machine in lacing a shoe.

A needle N, consisting conveniently of the ordinary straight hook needle, is mounted on the forward end of needle bar 1 carried in suitable bearings 2, extended from a part of the frame of the machine, in which bearings the needle bar is adapted to reciprocate. The needle bar is reciprocated by means of a lever 3, pivoted at 4 to a stationary part of the machine; the lever carries upon its opposite end a pin 5 which engages the slot 6 in the projection 7 from the sleeve 8 secured to the needle bar. The lever 3 is provided intermediate its ends with a cam roll 9 which engages a cam-path 10 in the cam disk 11 secured on the main shaft 12 of the machine. The above-described arrangement and the shape of the cam path are such that the needle is caused to move forward through the eyelet holes in the opposite side of the upper where it receives the thread which is then laid in its hook, and then retracted to draw a loop of thread through the eyelet holes of the upper.

The cast-off C consists of a bar, provided on its end with a slight projection, mounted in a cast-off carrier 13 embracing the needle at its forward end and having its rear end secured in the carrier disk 14. A similar carrier disk 15 is mounted upon the rear end of the needle bar 1 and the two disks 14 and 15 are connected together by means of a bar 16 rigidly secured at its ends in the disks 14 and 15. The disks 14 and 15 are slidingly mounted on the needle bar 1 and adapted as well to turn thereon so as to move the cast-off around the needle. Two motions are imparted to the cast-off, a reciprocating motion and an oscillating motion, to cause the cast-off to move forward and enter the loop of thread drawn back by the needle, to turn into position to support the loop so entered so that the needle may draw the next loop through it, and to return to its original position. The reciprocating motions of the cast-off is secured by means of a bell crank lever 17, pivotally mounted upon the shaft 18, secured in the support 19, projected from the frame of the machine. The lower end of the bell crank lever carries a cam roll 21 which engages a cam surface 22 of the cam disk 23 mounted upon the main shaft 12 of the machine. The spring 24 secured at one end to the lower end of the bell crank lever 17 and at the other end to a stationary part of the machine normally acts to hold the cam roll 21 in engagement with the cam surface 22. The oscillating movements of the cast-off are secured by the following mechanism: A disk 25 provided upon one side with a pinion 26 loosely mounted upon the needle bar 1 has a notch 27 in its side which engages the bar 16 above referred to so that oscillations of the disk 25 impart corresponding oscillations to the disk 14 which supports the cast-off carrier. A segmental gear 28 upon one end of the bell crank lever 29, pivoted upon a stationary part of the machine is employed to oscillate the pinion 26. The lower end of the bell crank lever 29 carries a cam roll 30 which engages a cam surface 31 of the cam disk 32 mounted upon the main shaft 12 of the machine. A spring 33 secured at one end to the lower end of the bell crank lever 29 and at the other end to a stationary part of the machine as to the bar 34, normally acts to hold the cam roll 30 against the cam surface 31. The above-described arrangement of the cast-off, its carrier, and the mechanism for reciprocating and oscillating the cast-off, including the cam surfaces 22 and 31, are such that when the needle advances the cast-off advances and enters the loop of thread drawn down by the thread finger T, then it turns upwardly until it occupies a position above the needle holding the loop of thread standing around the needle open so that the retracting needle may draw its loop of thread through the loop of thread standing around it, then after the needle has retracted and drawn its loop of thread through the loop of thread previously standing around it, and still standing on the cast-off, the cast-off rotates approximately one quarter of a revolution so as to cast off its loop of thread upon the loop of thread just drawn through by the needle, thereafter completing its oscillatory movement and returning to its lowermost position as seen in Fig. 1 ready to advance again and enter the loop of thread just drawn back by the needle and opened by the thread finger.

The thread finger T, the operative end of which extends perpendicularly to the needle, is mounted in a thread finger carrying lever 35, pivoted to move in a horizontal plane upon the pin 36, and to move in a vertical plane upon the pin 37 mounted in a bearing 38 projected from the frame of the machine; the pin 37 carrying the pin 36 in the manner which will be readily understood by an inspection of Fig. 1 of the drawings. A downwardly extended projection 39 from the lever 35 is provided with two cam rolls 40 and 41 which bear against the two cam surfaces 42 and 43 respectively to impart lateral and vertical movements to the thread finger in co-operation with the spring 44 which is attached at one end to the forward end of the lever 35 and at the other end to a stationary part of the machine in such position as to hold the cam rolls 40 and 41 against their cam surfaces. The above-described arrangement and the shape of the cam surfaces are such that after the needle has been retracted drawing with it a loop of thread the thread finger is permitted to descend under the influence of the spring to engage and pull down the loop of thread just drawn back by the needle into position so that the cast-off may enter the same. After the cast-off has moved forward and engaged the loop of thread thus drawn down by the thread finger the thread finger is moved laterally and thereby withdrawn from engagement with the loop of thread, releasing such loop after which the thread finger is returned to its first position above the needle where it stands stationary until the needle has drawn back the next loop of thread. The thread finger T not only has the function of spreading the loop to receive the cast-off but it also has the important function of holding the loop of thread drawn back by the needle upon the needle side of the work until the thread hook H engages the loop of thread, as hereinafter described, upon the opposite side of the work when the thread finger disengages itself from such loop of thread thereby giving up its thread to the thread hook so that the latter may have slack thread to draw back to the point of the loop retainer R. In this respect the thread finger comprises means for retaining slack thread on the needle side of the work. Besides these functions the thread finger T also acts to retain the thread in the hook of the needle during the feed of the work from which it would be liable to escape but for the presence of some means for retaining the thread in the hook of the needle.

The finder F is an awl shaped instrument adapted to engage two opposed eyelets of an upper to support the same in proper position in the machine. The finder F is supported in the finder bar 45 mounted in suitable bearings 46 on the frame of the machine being adapted to reciprocate in such bearings in alinement with the needle. The finder is reciprocated by means of a lever 47, pivoted at 48 to a stationary part of the machine; the lever 47 is provided at its free end with a pin 49 which engages a slot 50 in a projection 51 from a sleeve 52 secured to the finder bar 45. The lever 47 carries intermediate of its ends a cam roll 53 which engages a cam path 54 in the cam disk 55 mounted upon the auxiliary shaft 56 driven by bevel gearing 57 through the intermediate shaft 58 from the main shaft 12 of the machine. The above-described arrangement and the shape of the cam path 54 are such that the finder is moved back and forth in timed relation to the movement of the needle so that it stands still and holds the work in position for the needle to pass through two opposed eyelet holes then after the needle has nearly reached the work it retreats in advance of the needle until the needle has reached its most forward position, whereupon it follows the retracting needle again through the eyelet holes as the needle draws its loop of thread therethrough.

A work rest W is provided mounted upon a convenient portion of the frame of the machine in such position that the upper may be laid against it with the finder F in its forward position projecting through two opposed eyelets thereof. The work rest is located below and on the left of the finder or work support as viewed in Fig. 4 thereby affording a convenient gage or guide for the operator to hold the work against in presenting it to the machine.

The looper L is provided with a projection 59 which extends forwardly from a plate 60; the under side of the projection 59 and the front edge of the plate 60 forming an angle which receives the thread. The looper is mounted upon the forward end of a lever 61 pivotally supported at 62 upon a stationary part of the machine and having a rearwardly extended arm carrying a cam roll 63 which engages a cam surface 64 upon the cam disk 55 mounted upon the auxiliary shaft 56. The above described arrangement and the shape of the cam surface are such that the looper is depressed by the cam surface after the needle has reached its forward position extending through the eyelet holes of the shoe upper thereby laying the thread in the hook of the needle, and again rising after the needle has retracted and drawn a loop of thread through the eyelets. It is to be understood that wherever in the claims we have employed the term "loopers," we intend thereby to define any instrumentality which will operate to loop the thread in the hook of the needle.

The loop retainer R consists of a cylindrical bar rotatably supported by a shaft 66 mounted in a bearing 67 carried by a frame 68 having two bearings 69 upon the auxiliary shaft 56 of the machine. The loop retainer R is normally supported by its frame 68 in the position illustrated in Figs. 1 and 2 parallel to and slightly above the work rest W. The end of the loop retainer R is provided with a screw point upon which point a loop of thread is laid in a manner and for a purpose hereinafter described. The loop retainer is long so as to receive and retain a number of loops corresponding to the number of stitches made. The loop retainer is rotated by means of miter gears 70 and shaft 71 from the auxiliary shaft 56. A spring hook 72 engages and holds the frame 68 in the position shown in Figs. 1 and 2 against the action of the spring 73 connected at one end to one of the arms of frame 68 and at the other end to a stationary part of the machine. The spring hook 72 may be pressed back by the operator when an upper has been laced and it is desired to remove the same from the machine, whereupon the spring 73 will lift the frame 68 and thereby raise the loop retainer, so that the loops held thereon may be slid off of its end. It is to be noted that by rotating the loop retainer the loops will travel along the same with the work without offering resistance to the feed.

The thread hook H consists of a hook upon the forward end of an arm 74 secured to the rock shaft 75 which is actuated by means about to be described. After the work has been fed and during the time the needle is advancing, the thread hook is moved forward and then downwardly, to engage the loop of thread extending from the eyelet hole through which the previous loop had been drawn to the thread guide, and then it is moved rearwardly to deliver such loop of thread so taken to the loop retainer. The rock shaft 75 is rotatably mounted in the bearing 76 mounted upon the forward end of the thread hook bar 77 reciprocatingly mounted in bearings 78 projected from the frame of the machine; the rear end of the bar 77 carries a pin 79 which works in a groove 80 in the projection 81 from the frame of the machine thereby holding the bar 77 from rotation in its bearings but permitting sliding movements therein. A second pin 82 projected sidewise from the rear end of the bar 77 affords support for the connecting link 83 pivoted thereon at one end and pivoted at the opposite end at 84 to the upper end of the lever 85 in turn pivoted at 86 to a stationary part of the machine and carrying intermediate of its ends the cam roll 87 which is received in the cam path 88 of the cam disk 89 mounted upon the auxiliary shaft 56 of the machine. By this means reciprocating movements are imparted to the thread hook. An arm 90 mounted upon the opposite end of the rock shaft 75 from the arm 74 carries upon its end a pin 91 which engages a groove 92 in the forwardly extended end of an arm 93 of a bell crank lever pivotally supported at 94 in a bearing projected from the frame of the machine. The other arm 95 of the bell crank lever carries upon its end a cam roll 96 which engages a cam path 97 in the cam disk 98 mounted upon the auxiliary shaft 56 of the machine. The oscillations of the bell crank lever 93, 95 impart corresponding oscillations to the loop puller, through the means described, to raise and lower the hook of the puller at the proper times.

The thread hook H, as hereinbefore suggested, co-operates with the thread finger T and loop retainer R by drawing the thread from the thread finger and delivering it to the loop retainer. The thread hook thus comprises means for transferring slack thread from the needle side to the opposite side of the materials. When the thread hook H is retracted the loop of thread pulled upon by it is formed between the eyelet hole which has just been moved away from the finder and the looper L, as shown in Fig. 10, and the front edge of the plate 60 of the looper being inclined the thread slides into the apex of the angle between such edge and the under side of the projection 59, thus bringing the thread leading from the looper to the thread guide G, into position to be laid in the hook of the needle N when the needle is advanced through the next eyelet holes. The thread hook thus co-operates with the looper to secure the proper presentation of the thread to the needle.

A thread guide G is provided through which the thread from the supply passes on its way to the stitch forming instrumentalities. In the machines of the drawings this guide consists of a notch in the block 99 projecting from the frame of the machine alongside of the stitch forming instrumentalities and from which the thread passes under and around the projection 59 of the looper and thence back through a holder or thread clip g which consists of a groove cut in the same block 99 alongside of the groove above referred to. A spring 100 held down by a screw 101 covers these grooves or notches and holds the thread with yielding pressure therein. A pin 102 is employed to hold the spring 100 from accidental displacement A frame A is provided to support the various parts of the machine and in this connection it is to be noted that the parts of the machine are so supported with relation to each other and that the frame of the machine is of such shape as to afford a convenient space between the parts of the machine and the frame within which the operator may present the upper to the lacing instrumentalities. A pulley B is mounted upon the main shaft 12 of the machine which may be driven by a belt from any convenient source of power to operate the machine.

Figure 7:
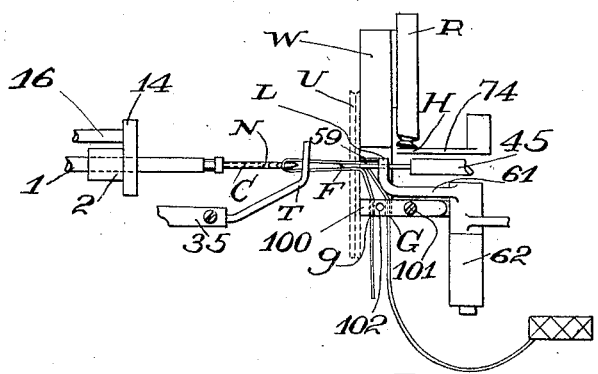
Figure 8:
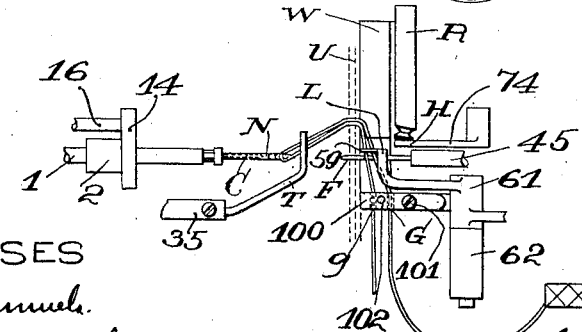

The operation of the embodiment of our invention shown in the drawings will be most clearly understood by reference to Figs. 5, 6, 7, 8, 9, 10, 11 and 12 which show the instrumentalities employed in forming the stitches in different positions which the parts assume during their operations. The machine is threaded by passing the thread from the cop or spool through the guide G thence over the finder F under the point 59 of the looper L, thence up over the projection 59 and back through the clip or holder g, the parts occupying at this time substantially the position illustrated in Fig. 5. The machine being threaded the operator will present the shoe upper U to the machine placing two opposed eyelets holes of an upper upon the finder F holding the same against the work rest W in the position illustrated in dash and dot lines in Fig. 5. It is to be noted that the loop retainer R at this time occupies the position illustrated in Fig. 1, that is, it is down adjacent to the work rest, in which position it remains until the upper has been laced and is to be removed from the machine. The machine is then started and the needle advances, passing through the eyelet holes whereupon the looper L descends and lays the bight of thread extending from the guide G to the looper L in the hook of the needle, the parts at this time occupying the position illustrated in Fig. 6. Thereupon the needle is retracted and the thread finger T, which during the forward movement of the needle has moved from the position under the needle, illustrated in Fig. 5, to the position over the needle, illustrated in Fig. 6, engages the loop, as seen in Fig. 7, and depresses the same thereby presenting it to the cast-off C which at this time stands under the needle as shown in Fig. 1. The operator then lifts the work off of the finder F and moves it forward and passes the next successive opposed eyelet holes over the finder thus bringing the parts into the positions illustrated in Fig. 8, the thread finger T acting to hold the thread in the hook of the needle during this operation, whereupon the cast-off and needle advance, the former entering the loop and the latter entering the eyelet holes which the finder then engages. Before the needle enters the eyelet holes, however, the cast-off has entered the loop of thread held by the needle and the thread finger T has been moved laterally to one side and released the loop of thread and the parts assume the position illustrated in Fig. 9. As the needle advances from the position illustrated in Fig. 8 to the position illustrated in Fig. 9 the thread hook advances with its hook raised, and, at the time the needle is about to enter the eyelet holes, the thread hook descends and engages the threads extending from the previous eyelet hole to the guide G and thread clip g. The continued operation of the machine causes the needle to advance through the eyelet holes, the cast-off in the meantime turning from its former position to a position above the needle so as to open the loop to permit the hook of the needle to pass therethrough without engagement therewith, the finder retreating in advance of the advancing needle and the thread hook pulling back the loop of thread engaged by it and the parts then assume the positions illustrated in Fig. 10, the thread finger having in the meantime risen to its position above the needle, and the thread hook having pulled its loop of thread back into position so that one of the sides of the loop of thread drawn back by it may be engaged by the point of the rotating loop retainer, it being observed that the point of the loop retainer at this time stands underneath the loop of thread drawn back by the thread hook and ready to engage the thread, and that as the loop retainer rotates, after the thread hook H again begins to advance, its screw point carries the loop of thread onto the body of the thread retainer R where it is held until the work is removed from the machine. It will be noted that the inclined forward face of the plate 60 of the looper L serves to guide the thread lying across such edge up into the apex of the angles between such face and the under side of the point 59 of the looper, as above referred to, thus compelling the threads to extend over the path of the advancing needle. The needle is then threaded by the descent of the looper with the two threads lying under the projection 59 of the looper and the needle and retracts, drawing two loops of thread through the second eyelet hole and through the previously formed loop extending through the first eyelet hole and around the needle and cast-off, thus securely fastening the first end of the thread by enchaining it with a subsequent loop. It has not been considered necessary to further extend the views illustrating the operation of the machine as these successive operations are repeated for the desired number of eyelet holes and then a knot is tied in the end of the thread outside of the eyelet holes. This is accomplished by the operator, after having formed the desired number of stitches through the eyelet holes, dropping the material so that the edges thereof are held below the level of the finder, whereupon, during the next series of operations of the stitch forming instrumentalities, the needle will draw a loop of thread through the previously formed loop standing around its shank and the parts will occupy the position illustrated in Fig. 11, it being observed that the last loop of thread drawn back by the needle extends through the previously formed loop, thereby forming a knot in the end of the thread and preventing the stitches from unraveling. Our invention comprehends also the employment of means independent of the stitch forming mechanism or lacing instrumentalities, if desired, for tying the knot in the end of the thread. It will be observed that the loop retainer R at this time holds a number of loops equal to the number of stitches which have been made and holds them out away from the material making the stitches of lengths greater than sufficient to extend around the materials so that when the upper is taken off the machine and opened it presents the appearance illustrated in Fig. 12. The operator now pulls up a loop of thread by taking hold of the thread at a, (see Fig. 12), and lifting it up, he then cuts the thread at this point, and after releasing the spring catch 72 he raises the work up and the act of lifting the work away from the machine causes the thread of the loop still held by the needle to reeve through the hook thereof, thus pulling the end of the last loop through the last previous loop and forming a knot.

Our invention is broad and generic in character and the embodiment thereof illustrated in the accompanying drawings is intended to convey to one skilled in the art the necessary information to enable him to construct and operate the machine; but our invention is by no means limited to the illustrated and described embodiment thereof as it is susceptible of embodiment in various and widely different forms without departure therefrom.

Having thus described our invention, we claim as new and desire to secure by Letters Patent.

1. A shoe lacing machine, having, in combination, means for engaging and locating pairs of eyelet holes of an upper and independent means for forming chain stitches therein, substantially as described.

2. A shoe lacing machine, having, in combination, means for engaging and locating pairs of eyelet holes of an upper and independent means for forming chain stitches therein, each of a length greater than sufficient to extend around the materials, substantially as described.

3. A shoe lacing machine, having, in combination, means for engaging and locating pairs of eyelet holes of an upper, and means for forming chain stitches therein and tying the end of the thread, substantially as described.

4. A shoe lacing machine, having, in combination, means for engaging and locating pairs of eyelet holes of an upper and means for forming a series of chain stitches therein having one or more of the loops formed with the thread doubled to hold one end of the thread, substantially as described.

5. A shoe lacing machine, having, in combination, means for engaging pairs of eyelet holes of an upper and means for forming a series of chain stitches therein having one or more of the loops formed with the thread doubled to hold one end of the thread and a stitch formed outside of the materials to hold the other end, substantially as described.

6. A shoe lacing machine, having, in combination, a hook needle, a looper, means for retaining slack thread in the loop drawn back by the needle, means for transferring such slack thread to the opposite side of the materials, and means for retaining the slack thread on the opposite side of the materials from the needle, substantially as described.

7. A shoe lacing machine, having, in combination, a hook needle, a looper, a cast-off, and means for retaining slack thread on the needle side of the work, substantially as described.

8. A shoe lacing machine, having, in combination, stitch forming mechanism and a rotating loop retainer acting to retain each loop until the completion of the lacing operation, substantially as described.

9. A shoe lacing machine, having, in combination, stitch forming mechanism, a loop retainer, and a thread hook for engaging the thread on the side of the work opposite the needle and carrying it to the loop retainer, substantially as described.

10. A shoe lacing machine, having, in combination, stitch forming mechanism, a thread finger for engaging the loop of thread drawn out by the needle, a loop retainer, and a thread hook for engaging the thread on the side of the work opposite the needle and carrying it to the loop retainer, substantially as described.

11. A machine for forming chain stitches, having, in combination, a hook needle, a looper, a cast-off, and means for moving the cast-off with relation to the needle to enter the loop on the side opposite the hook while the needle is back and to turn to a position over the hook when the needle is drawing the next loop of thread through the previously formed loop supported by the cast-off, substantially as described.

12. A shoe lacing machine, having, in combination, means for engaging and positioning pairs of eyelet holes of an upper, and independent mechanism for passing thread through the eyelet holes to tie the sides of the upper together, substantially as described.

13. A shoe lacing machine, having, in combination, means for engaging and positioning pairs of eyelet holes of an upper, and independent mechanism for passing thread through the eyelet holes to tie the sides of the upper together, and a thread retainer to retain long loops on one side of the upper, substantially as described.

14. A shoe lacing machine, having, in combination, means for engaging and positioning pairs of eyelet holes of an upper, and independent means for passing thread through the eyelet holes to tie the sides of the upper together, and to tie the last end of the thread to prevent unraveling, substantially as described.

15. A shoe lacing machine, having, in combination, means for engaging pairs of eyelet holes of an upper, and independent mechanism for passing thread through the eyelet holes to tie the sides of the upper together acting to secure both ends of the thread from unraveling or slackening, substantially as described.

16. A shoe lacing machine, having, in combination, means for engaging pairs of eyelet holes of an upper, and mechanism for passing thread through the eyelet holes to tie the sides of the upper together acting to secure both ends of the thread from unraveling or slackening and a loop retainer to retain long loops on one side of the material, substantially as described.

17. A shoe lacing machine, having, in combination, a hook needle, a looper and a thread finger for engaging the loop drawn back by the needle to form slack thread on the needle side of the work, substantially as described.

18. A machine for forming chain stitches, having, in combination, a hook needle, a looper, a thread finger for engaging the loop drawn back by the needle, and an oscillating and reciprocating cast-off, substantially as described.

19. A shoe lacing machine, having, in combination, a hook needle, a looper, a reciprocating thread hook for forming a bight of thread on the side of the work opposite the needle, and means for retaining such loops so formed by the thread hook, substantially as described.

20. A shoe lacing machine, having, in combination, a looper, a reciprocating thread hook for forming a bight of thread on the side of the work opposite the needle, and a rotatable loop retainer for retaining such loops so formed by the thread hook, substantially as described.

21. A shoe lacing machine, having, in combination, a hook needle, a looper, a reciprocating thread hook for forming a bight of thread on the side of the work opposite the needle, and a rotatable loop retainer for retaining such loops so formed by the thread hook having a screw point to take the successive loops from the thread hook and draw them onto the loop retainer, substantially as described.

22. A shoe lacing machine, having, in combination means for engaging and positioning the eyelets, a hook needle, and a looper formed to lay two threads in the hook of the needle, substantially as described.

23. A shoe lacing machine, having, in combination, a hook needle, a thread hook, a looper having surfaces to guide the thread during the retracting stroke of the thread hook into position to thread the needle, substantially as described.

24. A shoe lacing machine, having, in combination, stitch forming mechanism, a rotatable loop retainer, and means for supporting the loop retainer adjacent to the work permitting movement of the loop retainer to remove the work from the machine, substantially as described.

25. A shoe lacing machine, having, in combination, stitch forming mechanism, and a loop retainer consisting of a bar supported at one end so as to receive successive loops over the other end, substantially as described.

26. A shoe lacing machine, having, in combination, stitch forming mechanism, a loop retainer consisting of a movable bar to receive successive loops over its end, and means for supporting the loop retainer having provision for moving it away from its operative position to take work out of the machine, substantially as described.

27. A shoe lacing machine having in combination means for engaging pairs of eyelet holes of an upper successively presented thereto, and means for forming chain stitches in the eyelet holes, substantially as described.

28. A shoe lacing machine having in combination means for engaging pairs of eyelet holes of an upper successively presented thereto, and means for forming chain stitches in the eyelet holes, each of a length greater than sufficient to extend around the materials, substantially as described.

29. A shoe lacing machine having in combination means for engaging pairs of eyelet holes of an upper successively presented thereto, and means for forming chain stitches in the eyelet holes, and tying the end of the thread, substantially as described.

30. A shoe lacing machine having in combination means for engaging pairs of eyelet holes of an upper successively presented thereto, and means for forming chain stitches in the eyelet holes, having one or more of the loops formed with the thread doubled to hold one end of the thread, substantially as described.

31. A shoe lacing machine having in combination means for engaging pairs of eyelet holes of an upper successively presented thereto, and means for forming chain stitches in the eyelet holes, having one or more of the loops formed with the thread doubled to hold one end of the thread, and a stitch formed outside of the materials to hold the other end, substantially as described.

32. A shoe lacing machine having in combination means for locating an upper in position to be operated on, and means for forming stitches in the eyelet holes of the upper and for securing the ends of the thread, substantially as described.

33. A shoe lacing machine, having, in combination, a needle and suitable thread-handling devices co-operating therewith to form stitches in the eyelets of an upper, and a laterally fixed device for engaging the eyelets and positioning them properly to be engaged by the needle, substantially as described.

34. A shoe lacing machine, having, in combination, means for forming in the eyelet holes of an upper a continuous series of stitches to form a lacing connecting the sides of the upper together and for securing the ends of the lacing, and means for producing a predetermined amount of slack in said lacing to permit the edges of the lacing slit to be positioned properly on the last.

35. A shoe lacing machine, having, in combination, means for passing a continuous thread through the eyelet holes of an upper to form a lacing and for securing the ends thereof, and means for producing a predetermined amount of slack in said lacing to permit the edges of the lacing slit to be positioned properly on the last.

36. A shoe lacing machine, having, in combination, means for passing a continuous thread through the eyelet holes of an upper to form a lacing and for securing the ends thereof, and means for maintaining a predetermined amount of slack in said lacing between each pair of eyelet holes until the lacing operation has been completed to permit the edges of the lacing slit to be positioned properly on the last.

37. A shoe lacing machine, having, in combination, means including a hook needle and a looper for forming in the eyelet holes of an upper a continuous series of stitches from a single thread to form a lacing connecting the sides of the upper together, and means for producing a predetermined amount of slack in said lacing to permit the edges of the lacing slit to be positioned properly on the last.

38. A shoe lacing machine, having, in combination, a thread supply, means for holding the free end of the thread, and means for passing a continuous thread from said supply through the eyelet holes of an upper to form a lacing and for securing the ends thereof.

39. A shoe lacing machine, having in combination, a thread supply, means for holding the free end of the thread, means for passing a continuous thread from said supply through the eyelet holes of an upper to form a lacing and for securing the ends thereof, and means for producing a predetermined amount of slack in said lacing to permit the edges of the lacing slit to be positioned properly on the last.

40. A shoe lacing machine, having, in combination, means for forming in the eyelet holes of an upper a continuous series of stitches to form a lacing connecting the sides of the upper together, means to locate the eyelet holes in position, to receive the lacing and means for producing a predetermined amount of slack in said lacing to permit the edges of the lacing slit to be positioned properly on the last.

41. A shoe lacing machine, having, in combination, means for passing a continuous thread through the eyelet holes of an upper to form a lacing, means to locate the eyelet holes in position to receive the lacing and means for producing a predetermined amount of slack in said lacing to permit the edges of the lacing slit to be positioned properly on the last.

42. A shoe lacing machine, having, in combination, means for passing a continuous thread through the eyelet holes of an upper to form a lacing, means to locate the eyelet holes in position to receive the lacing and means for maintaining a predetermined amount of slack in said lacing between each pair of eyelet holes until the lacing operation has been completed, to permit the edges of the lacing slit to be positioned properly on the last.

43. A shoe lacing machine, having, in combination, means for forming in the eyelet holes of an upper a lacing to connect the sides of the upper together, and means operating in substantially a horizontal plane and passing through alined eyelet holes in opposite sides of the upper to support the upper during the lacing operation.

44. A shoe lacing machine, having, in combination, devices co-operating to form in the eyelet holes of an upper a lacing connecting the sides of the upper together, said devices comprising means operating in substantially a horizontal plane and passing through alined eyelet holes in opposite sides of the upper to support the upper.

45. A shoe lacing machine, having, in combination, means for passing a continuous thread through the eyelet holes of an upper to form a lacing, and means passing through alined eyelet holes in opposite sides of the upper to locate the eyelet holes in position to receive the lacing.

46. A shoe lacing machine, having, in combination, means for passing a continuous thread through the eyelet holes of an upper to form a lacing, and means for locating pairs of eyelet holes in opposite sides of the upper in proper position with relation to said means.

In testimony whereof we affix our signatures, in presence of two witnesses.

JOHN S. PAINE.
ERASTUS E. WINKLEY.

Witnesses to Paine's signature:
THOMAS HARRY WRIGHT,
WILLIAM RICHARDSON THORPE.
Witnesses to Winkley's signature:
HORACE VAN EVEREN,
BENJAMIN PHILLIPS.